(No Model.)
W. J. BREWER.
CABLE RAILWAY.
No. 439,342. Patented Oct. 28, 1890.
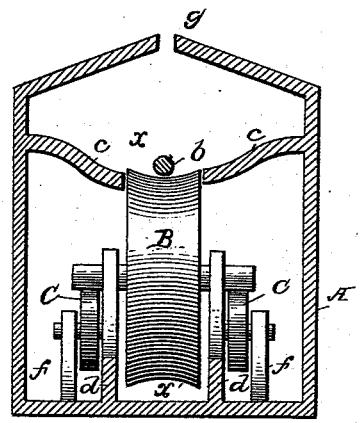
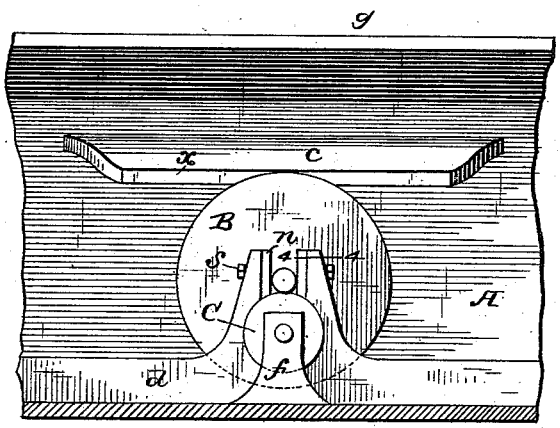
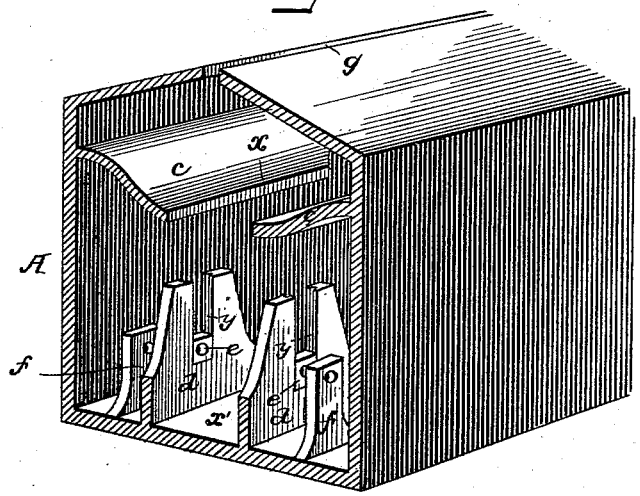
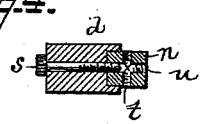
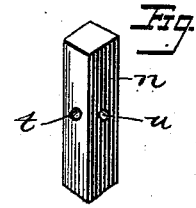
Witnesses
Inventor
William J. Brewer

UNITED STATES PATENT OFFICE.

WILLIAM JOHN BREWER, OF NEW YORK, N. Y.

CABLE RAILWAY.

SPECIFICATION forming part of Letters Patent No. 439,342, dated October 28, 1890.

Application filed July 3, 1888. Serial No. 278,900. (No model.)

*To all whom it may concern:*

Be it known that I, WILLIAM JOHN BREWER, a subject of the Queen of Great Britain, having declared my intention to become a citizen of the United States, residing in New York, in the county and State of New York, have invented certain new and useful Improvements in Cable Railways, of which the following is a specification.

My invention relates to cable railways; and it consists in the novel features of construction and arrangement set forth hereinafter and claimed.

In the drawings, Figure 1 is a transverse section of a cable-railway conduit, with the cable and supports illustrating my improvements. Fig. 2 is a longitudinal section of part of the conduit. Fig. 3 is a perspective view of parts of the conduit; Fig. 4, a cross-section on the line 4 4, Fig. 2; Fig. 5, a perspective view of one of the reversible bearings.

The conduit A is constructed or built up in any ordinary or suitable manner, the top having the usual central slot $x$, and the cable-supporting wheels B being arranged at intervals along the conduit and below the slot to support the traveling cable $b$. In gripping and releasing the cable the latter is sometimes deflected, so that instead of dropping back onto the faces of the pulleys it drops to one side and jams or rides against the pulleys or their supports and is speedily worn, frayed, or broken. To avoid this result I provide the conduit adjacent to each wheel with two inner downwardly-inclined side flanges $c\ c$ and curve the faces of the rollers to meet the side flanges, so that should the cable be deflected or vibrate to one side at any point within the conduit it will be guided back by one of said flanges onto the recessed or grooved faces of the pulleys.

Inasmuch as the traveling of the cable upon the faces of the flanges would ordinarily result in considerable friction and wear, I form in the conduit a continuous longitudinal trough $x'$, which I fill with oil or other lubricant to such an extent that the peripheries of the pulleys will turn therein, carrying the oil upward and onto the cable, and throwing it also into the faces of the flanges, which thus become so thoroughly lubricated that there is but little friction and wear when the cable travels thereon.

When the pulleys are provided, as usual, with journals turning in side bearings within the conduit, any sinking or deflection of the bearing or the gumming or obstruction of the journals results in arresting or retarding the revolutions of the pulleys and in great wear of the cable and in enormous friction and loss of power. To prevent this I mount each wheel B upon anti-friction disks C, so that each journal will rest on the upper part of the periphery of one of the disks and will extend through a slot $y$ in a guide-plate $d$, so that while there is a minimum of frictional resistance to the rotation of the wheel any ordinary displacement of the bearings will have no effect in jamming or binding the journals.

The parts may be supported in different ways, as shown. Each plate $d$ is a vertical flange on the bottom of the conduit, increased in height where the wheels are to be supported, and constituting, with the bottom of the conduit, the trough $x'$ for the lubricant.

The journals of the disks C turn in bearing-blocks $e$, fitting the slots $y$, and in openings in standards $f$, arranged opposite the slotted portions of the plates $d$. To avoid the wear of the permanent plates $d$ by the journals of the pulleys B, I fit to the side of each slot $y$ a detachable bearing-block $n$, which is so secured that it may be inverted and reversed, so as to bring the four sides successively into position to afford bearings for the said journal. This block may be secured in any suitable way. As shown, it is seated in a recess in the edge of the slot $y$ (see Fig. 4) and has two transverse threaded openings $t\ u$, so that it may be secured to its seat by a screw $s$ with either side outward.

As shown, the conduit is of cast metal in the form of a box with a slotted top $g$ and internal side flanges $c\ c$, bottom flanges $d\ d$, and standards $f\ f$.

Without limiting myself to the precise construction and arrangement of parts shown, I claim—

1. A conduit having a central oil-trough, cable-supporting wheels turning in said trough, and inclined side flanges c c, substantially as described.

2. The bearings n, fitted detachably and reversibly to the sides of the slots y, substantially as and for the purpose described.

3. A conduit containing a cable, pulleys B B, anti-friction disks C C, slotted plates d d, and standards f f, substantially as described.

In testimony whereof I have signed my name to this specification in the presence of two subscribing witnesses.

WILLIAM JOHN BREWER.

Witnesses:
   HENRY T. BUELL,
   LOUIS WALSH.